Patented Apr. 2, 1940

2,195,949

UNITED STATES PATENT OFFICE 2,195,949

PROCESS FOR MAKING REFRACTORY BODIES AND MATERIALS

Arthur Roland Wood, St. Helens, England, assignor to Pilkington Brothers Limited, Liverpool, England, a company of Great Britain No Drawing. Application September 16, 1936, Serial No. 101,086. In Great Britain September 21, 1935

4 Claims. (Cl. 106—9)

This invention relates to refractory materials and the process of making them, and has for its object improved refractory bodies and an improved process for making them.

Refractory bodies containing crystals of mullite have been formed from mixtures containing mainly alumina and silica or their compounds usually with the addition of a flux, such as felspar, and firing at a temperature below the melting point of the mullite. The bodies, however, have always consisted of mullite or of mullite and corundum in a considerable proportion of glassy matrix, and the crystals of mullite have generally been small.

Now bodies which contain a large proportion of mullite in the form of large crystals are of great value for many purposes, because they have a high resistance to crushing. Mullite crystals are long rods which are well adapted to interlock, and thus form a mass which resists deformation.

Refractory bodies have been made by melting clay-alumina mixtures in an electric arc furnace, and allowing them to form crystals of mullite or mullite and corundum on cooling, but the cost of such bodies is very high by reason of the high temperatures necessary for melting the raw material.

It has hitherto been found impossible, by firing the above-mentioned mixtures at temperatures below the melting point of mullite (1810 degrees C.) to obtain a material consisting of a very large proportion of large crystals of mullite. If the ratio of alumina to silica in the mixture is increased towards the ratio in mullite, which is 2.55, crystals of corundum (which is a form of alumina) are formed, leaving an excess of silica in the rest of the material, so that the material consists of crystals of mullite and of corundum in a considerable proportion of glassy matrix. Further the mullite crystals are very small.

Thus, in a mixture of china clay and alumina with 20% of felspar, fired at 1750 degrees C., when the alumina-silica ratio is small, so that the proportion of mullite to glassy matrix is also small, the crystals are large. As the alumina-silica ratio is increased, so that the proportion of mullite increases, the crystals diminish in size, and, when the alumina-silica ratio reaches 1.80, the crystals are very small, and corundum has begun to appear; this has the result that the proportion of mullite cannot be increased by any further increase in the alumina-silica ratio. At a lower firing temperature of 1500, corundum begins to appear at an alumina-silica ratio of 0.87, indicating a much smaller proportion of mullite.

By the invention, bodies can be made at firing temperatures below the melting point of the mixture, consisting mainly of large crystals of mullite, in any desired proportion of glassy matrix, down to the minimum necessary to form a consistent mass.

The quality of a refractory body depends on various characteristics, such as its ability to withstand high temperatures without softening, its resistance to crushing, its resistance to attack by fluxes and other molten liquids, and its density. For some purposes certain of these characteristics are of greater importance and for other purposes others are. Thus, while a high softening point is important for most purposes, resistance to crushing is important in blocks which are subjected to load, while resistance to attack by fluxes is most important in blocks used, for instance, in a glass tank.

In order to give a definite meaning to the word "large" when applied to mullite crystals, the range of size of the mullite crystals found in a very large number of refractory bodies made by applicant will be stated; the range was from 0.005 to 0.025 mm., taking the average size of crystal in any given body. Crystals in the latter part of this range are regarded as large.

According to the invention, a body consisting of crystals in a glassy matrix, in which the crystals are substantially only mullite and form the greater proportion of the body, is formed from a mixture consisting substantially of alumina and silica and/or compounds thereof and a fluorine-containing substance. The firing temperature is below 1770 degrees. The alumina-silica ratio in the mixture has such a value, depending on the nature and quantity of the fluorine-containing substance and the firing temperature, that the body, after firing consists mainly of mullite. Preferably, the alumina-silica ratio has a value approximating to that at which, with increasing alumina-silica ratio, corundum crystals first appear.

By adding a fluorine-containing substance to an alumina-silica mixture, the nature and quantity of the crystalline phase in the resulting body can be controlled. The alumina-silica ratio in the mixture, the nature and quantity of the fluorine-containing substance and the firing temperature are related. Dependent on their relation, the resulting product will consist of one of the following:

(1) A mass of mullite crystals in a glassy matrix, the proportion of glassy matrix being reducible to the minimum necessary by suitable selection of the alumina-silica ratio, the nature and quantity of the fluorine-containing substance and the temperature of firing. The product then consists almost entirely of mullite.

(2) A mixture of mullite and corundum crystals in a glassy matrix.

(3) A mass of corundum crystals in a glassy matrix.

With so many variables, it is impossible to state the products resulting from all the combinations of the variables. There will therefore be described the products resulting from certain combinations, and then the general effect of varying each of the variables. Further the combinations will be mentioned giving the best commercial products at present known to applicant.

The general effect of adding a fluoride to a mixture consisting substantially of alumina and silica will be seen from the following description of the products resulting from a series of mixtures with increasing proportions of alumina, when 10% of fluorspar is added, and the mixture fired at 1720 degrees.

Starting with china clay only, in which the alumina-silica ratio is 0.81, the body produced consists of large mullite crystals in a considerable proportion of glassy matrix, and has a softening point of about 1675 degrees. Adding alumina to the china clay in gradually increasing quantity, there is, at first, a progressive increase in the proportion of mullite crystals to glassy matrix and a progressive rise in the softening point. These reach maxima at an alumina-silica ratio of 1.34, when the softening point is 1730 degrees.

Now mullite ($3Al_2O_3 2SiO_2$) has an alumina-silica ratio of 2.55. A body with alumina-silica ratio of 1.35, consisting of mullite and glassy matrix, will contain about 80% of mullite, assuming all the alumina to be in the mullite, and assuming perfect mixing of the mixture. In bodies made according to the invention, substantially all the alumina is in the mullite, and the body made as described above is, therefore, one with a very large proportion of mullite in the form of large crystals.

If the alumina in the mixture be still further increased, corundum crystals appear; these take up alumina only from the mixture, leaving a larger quantity of silica to form glassy matrix. With increasing alumina-silica ratio, the proportion of corundum and glassy matrix increases, and, as a consequence of the higher proportion of glassy matrix, the softening point becomes lower until it reaches a minimum of about 1650 degrees at an alumina-silica ratio of about 2.7. About this ratio (which is slightly in excess of the ratio in mullite), the mullite disappears from the body, which consists of corundum in a considerable proportion of glassy matrix. Further, as the corundum in the body increases, so the mullite crystals become smaller.

Thus, adding 10% of fluorspar, and firing at 1720 degrees, the best mullite body is obtained with an alumina-silica ratio in the neighbourhood of 1.34.

When the same series of mixtures are fired at 1540 degrees instead of 1720, it is found, contrary to what has been generally found to occur in clay mixtures without a fluoride addition, that corundum crystals appear at a lower alumina-silica ratio. Further, the mullite crystals formed are smaller. The best mullite body that can be made, firing at 1540 degrees contains about 76% of mullite assuming perfect mixing.

If, now, the quantity of fluorspar be reduced to 5%, and the series of mixtures fired at 1720 degrees, corundum crystals do not appear until the alumina-silica ratio is above that in mullite, and a body is obtained with an alumina-silica ratio of about 2.5, which is almost entirely mullite in large crystals with only sufficient glassy matrix to form a consistent mass. The body has a very high softening point over 1750 degrees and high resistance to crushing.

If the firing temperature be reduced to 1600 degrees, a mullite body can be obtained with alumina-silica ratios up to about 1.5, with over 84% of mullite in crystals of fair size.

At a still lower firing temperature of 1500 degrees, a mullite body can be obtained with alumina-silica ratios up to about 1, with up to 70% of mullite in crystals which are substantially smaller.

If the quantity of fluorspar be reduced to 3% and the mixture fired at 1600 degrees, the results are substantially the same as with 5% of fluorspar, but the mullite crystals are smaller.

If 10% of magnesium fluoride be used instead of 10% of fluorspar, the bodies formed at a firing temperature of 1720 degrees are similar.

With 20% of lepidolite (containing about 5% of fluorine) a mixture with alumina-silica ratio of about 2.6, fired at 1760 degrees, consists almost entirely of mullite. When fired at 1600, a body with a very large proportion of mullite is obtained. The softening points of these bodies is very high, but the mullite crystals are small.

With 10% of opal glass, containing about 6% of fluorine, bodies having about 80% of mullite can be obtained with very high softening points, at firing temperatures from 1600 to 1760 degrees. With 20% of opal glass with firing temperature of 1730 degrees, the products are similar.

With 10% of cryolite and firing temperatures from 1600 to 1750 degrees, corundum crystals appear at low alumina-silica ratios of little over 1, and therefore bodies with large proportions (above 70%) of mullite cannot be obtained, but these bodies have very high softening points.

With 10% of sodium silico-fluoride and a firing temperature of 1600 degrees, bodies containing up to 80% of mullite can be obtained. With 10% of aluminium fluoride, and a firing temperature of 1750 degrees, corundum does not appear until the alumina-silica ratio is over 2, but the mullite crystals become small as this ratio is approached.

With 10% of zinc fluoride or lead fluoride and a firing temperature of 1750 degrees, mullite of fair size is obtained with an alumina-silica ratio of 1.4. Above this ratio, the mullite becomes smaller. The bodies formed with aluminium, zinc and lead fluorides have high softening points.

From the above it will be seen that the best mullite body which applicants have made is that formed from an alumina-silica mixture having an alumina-silica ratio of 2.5, with the addition of 5% of fluorspar, and fired at 1720 degrees, but that bodies of very high quality can be made at lower firing temperatures and with other fluorine containing substances.

With any given fluorine containing substance, in given quantity and fired at a given temperature, the quality of the mullite body produced begins to deteriorate as soon as corundum crystals appear, both the softening point and the size of crystal diminishing as the quantity of corundum mixed with the mullite increases.

This fact enables the best alumina-silica ratio to be ascertained by trial for any given set of conditions, by firing very small blocks or cones made from a series of mixtures with increasing alumina-silica ratio, dissolving away the glassy matrix in hydrofluoric acid and examining the remaining crystals under the microscope. The ratio at which corundum appears can thus be found, and the body made with approximately this ratio has the largest proportion of mullite and the highest softening point for the given set of conditions.

With certain fluorides, for example, those of aluminium, zinc and lead, larger crystals are obtained below this ratio, and therefore, for certain purposes, it may be preferable to use a lower ratio.

In regard to the fluorine-containing substance, one that is not readily soluble in water should be used, for the reason that, when any of the substance is dissolved in the water which is necessarily used in the mixture, it becomes unevenly distributed in the mixture during the evaporation of the water in the process of drying. The degree of solubility which is permissible depends on the proportion of water used in the mixture and it cannot therefore be precisely defined. By the phrase "not readily soluble fluorine containing substance" is meant a substance of which so small a proportion is dissolved in the water used in the mixture that any lack of homogeneity in the refractory block produced, as a result of the dissolved substance, is negligible.

It is preferable, especially when a body consisting almost entirely of mullite is to be made, to employ a fluorine-containing substance which is so volatile at the temperatures used, that most of it disappears from the body by volatilization.

The main constituents of any mixture to produce a body with mullite only as the crystalline phase, must be, apart from the fluorine containing substance, alumina and silica or their compounds, but a portion of these materials must be in plastic form, otherwise the bodies formed are powdery.

The time of firing the mixture is a factor which cannot be specified, because it depends largely upon the size and shape of the body formed, and on the rate at which the temperature of the furnace employed is raised. It must, therefore, be ascertained by trial for any particular size and type of body and for the furnace employed. As a guide, however, it may be stated that the results set out above were obtained by the expenditure of substantially less heat energy than that required to form bodies of good quality without the addition of a fluorine containing substance. As a further guide, the following results obtained by applicants is stated:—A mixture of 80% of china clay, and 20% of felspar, fired at 1500 degrees for six hours, produced a body having mullite in the form of small crystals. On replacing one quarter of the felspar by fluorspar, much larger crystals are formed at the same temperature in three hours. With mixtures according to the invention, however, the formation of mullite crystals and their size is favoured by increasing the time of firing.

Bodies made according to the invention may be shaped in the various ways customarily employed in making refractory bodies. They may be made directly from the raw materials, but then the contraction is too great for most purposes. It is preferred to make a grog from a mixture according to the invention, to grind this grog and then to add a binder consisting of approximately the same raw materials, to form the body of this mixture and then to fire it.

The crystals referred to in this specification as "mullite" are, applicant believes, mullite only. Since, however, sillimanite crystals are not easily distinguishable from mullite crystals, some of the crystals when these are small, may be sillimanite.

The glassy matrix is generally amorphous but occasionally contains some crystalline matter which is soluble in hydrofluoric acid. Such crystalline matter is useful only in so far as the glassy matrix is useful, in forming a consistent body, and is therefore deemed to be a part of the glassy matrix.

Having described my invention, I declare that what I claim and desire to secure by Letters Patent is:

1. Process of making a refractory body in which the crystals are substantially only mullite, by adding to a mixture consisting substantially of alumina and silica, the alumina when not hydrated being in the form of silicates, at least one of the following fluorine containing substances in total quantity not exceeding 20%:— fluorspar in quantity of 3% to 15%, lepidolite in quantity of 10% to 20%, fluorine containing opal glass in quantity of 5% to 20%, sodium silica-fluoride in quantity from 5% to 15%, magnesium fluoride in quantity from 5% to 15%, aluminium fluoride in quantity from 5% to 15%, zinc fluoride in quantity from 5% to 15%, and firing the mixture at a temperature between 1500° C. and 1770° C., the alumina-silica ratio in the whole mixture being between 1.2 and 2.75.

2. Process of making a refractory body in which the crystals are substantially only mullite, by adding to a mixture consisting substantially of alumina and silica, the lumina when not hydrated being in the form of silicates, at least one of the following fluorine containing substances in total quantity not exceeding 20%:— fluorspar in quantity of 3% to 15%, lepidolite in quantity of 10% to 20%, fluorine containing opal glass in quantity of 5% to 20%, sodium silica-fluoride in quantity from 5% to 15%, magnesium fluoride in quantity from 5% to 15%, aluminium fluoride in quantity from 5% to 15%, zinc fluoride in quantity from 5% to 15%, and firing the mixture at a temperature between 1500° and 1770° C., the alumina-silica ratio in the whole mixture being between 1.2 and 2.75, and having a value approximating to that at which, with increasing ratio, corundum crystals first begin to appear.

3. Process of making a refractory body in which the crystals are substantially only mullite by making a grog of a body made in accordance with claim 1 and firing it with a binder made of a mixture in accordance with claim 1, at a temperature between 1500° C. and 1770° C.

4. Process of making a refractory body in which the crystals are substantially only mullite by making a grog of a body made in accordance with claim 2 and firing it with a binder made of a mixture in accordance with claim 2, at a temperature between 1500 C. and 1770° C.

ARTHUR ROLAND WOOD.